US012668435B2

(12) United States Patent
Costanzo et al.

(10) Patent No.: US 12,668,435 B2
(45) Date of Patent: Jun. 30, 2026

(54) SORTING CONVEYOR SYSTEM

(71) Applicant: Laitram, L.L.C., Harahan, LA (US)

(72) Inventors: Mark Costanzo, New Orleans, LA (US); Christopher Alan Brupbacher, New Orleans, LA (US); Joseph L. Eustis, Washington, DC (US); Destin Jacob Bailey, Marrero, LA (US); Matthew Kesler Richards, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 293 days.

(21) Appl. No.: 18/291,990

(22) PCT Filed: Jun. 15, 2022

(86) PCT No.: PCT/US2022/033606
§ 371 (c)(1),
(2) Date: Jan. 25, 2024

(87) PCT Pub. No.: WO2023/009233
PCT Pub. Date: Feb. 2, 2023

(65) Prior Publication Data
US 2025/0066128 A1 Feb. 27, 2025

Related U.S. Application Data

(60) Provisional application No. 63/226,236, filed on Jul. 28, 2021.

(51) Int. Cl.
| | |
|---|---|
| *B65G 47/44* | (2006.01) |
| *B65G 11/08* | (2006.01) |
| *B65G 11/12* | (2006.01) |

(52) U.S. Cl.
CPC ............ *B65G 47/44* (2013.01); *B65G 11/081* (2013.01); *B65G 11/123* (2013.01)

(58) Field of Classification Search
CPC .... B65G 11/081; B65G 11/123; B65G 47/44; B65G 47/57
See application file for complete search history.

(56) References Cited

U.S. PATENT DOCUMENTS

| | | | | | |
|---|---|---|---|---|---|
| 2,494,103 | A | * | 1/1950 | Penberthy .............. | B65G 47/44 |
| | | | | | 198/525 |
| 3,918,572 | A | * | 11/1975 | Wirth ..................... | B65G 47/34 |
| | | | | | 198/530 |
| 4,047,712 | A | * | 9/1977 | Burkhardt .............. | B65H 29/60 |
| | | | | | 198/359 |

(Continued)

FOREIGN PATENT DOCUMENTS

| | | |
|---|---|---|
| CN | 211282747 U | 8/2020 |
| JP | 08-032324 B2 | 3/1996 |

*Primary Examiner* — Gene O Crawford
*Assistant Examiner* — Keith R Campbell
(74) *Attorney, Agent, or Firm* — James T. Cronvich

(57) ABSTRACT

A conveyor system comprising a sorting conveyor sorting articles off one or both sides to a chute system that includes an upper chute and a lower slide. Articles slide down the chute system to a discharge conveyor. The upper chute and the lower slide are separated by a gap. And the upper chute has a topography that prevents articles from tipping over onto another side. The chute system provides a large drop in elevation in a small footprint to conserve floor space.

26 Claims, 5 Drawing Sheets

(56)                    References Cited

U.S. PATENT DOCUMENTS

| | | | |
|---|---|---|---|
| 4,494,900 A * | 1/1985 | Johnson | B65G 47/44 |
| | | | 198/406 |
| 5,054,601 A | 10/1991 | Sjogren et al. | |
| 5,340,099 A | 8/1994 | Romanenko et al. | |
| 5,636,723 A * | 6/1997 | Bulle | B65H 29/60 |
| | | | 198/367.1 |
| 9,126,758 B2 * | 9/2015 | Kennedy | B65G 47/44 |
| 10,160,599 B2 * | 12/2018 | Hartmann | B65G 11/023 |
| 11,453,556 B2 * | 9/2022 | Wargo | B65G 11/183 |
| 12,172,849 B2 * | 12/2024 | Li | B07C 3/08 |
| 12,358,730 B2 * | 7/2025 | Kuznecov | B07C 5/02 |
| 2009/0127074 A1 * | 5/2009 | Cavallo | B65G 11/203 |
| | | | 198/784 |
| 2019/0161286 A1 | 5/2019 | Hughes et al. | |

* cited by examiner

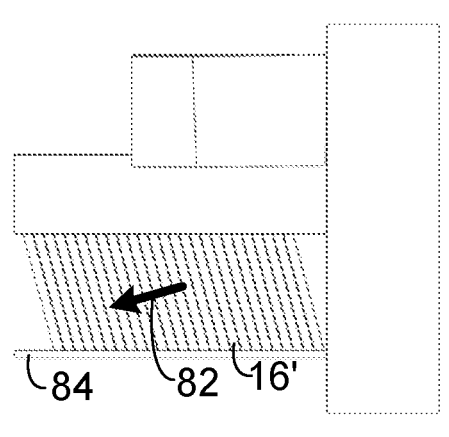
FIG. 5
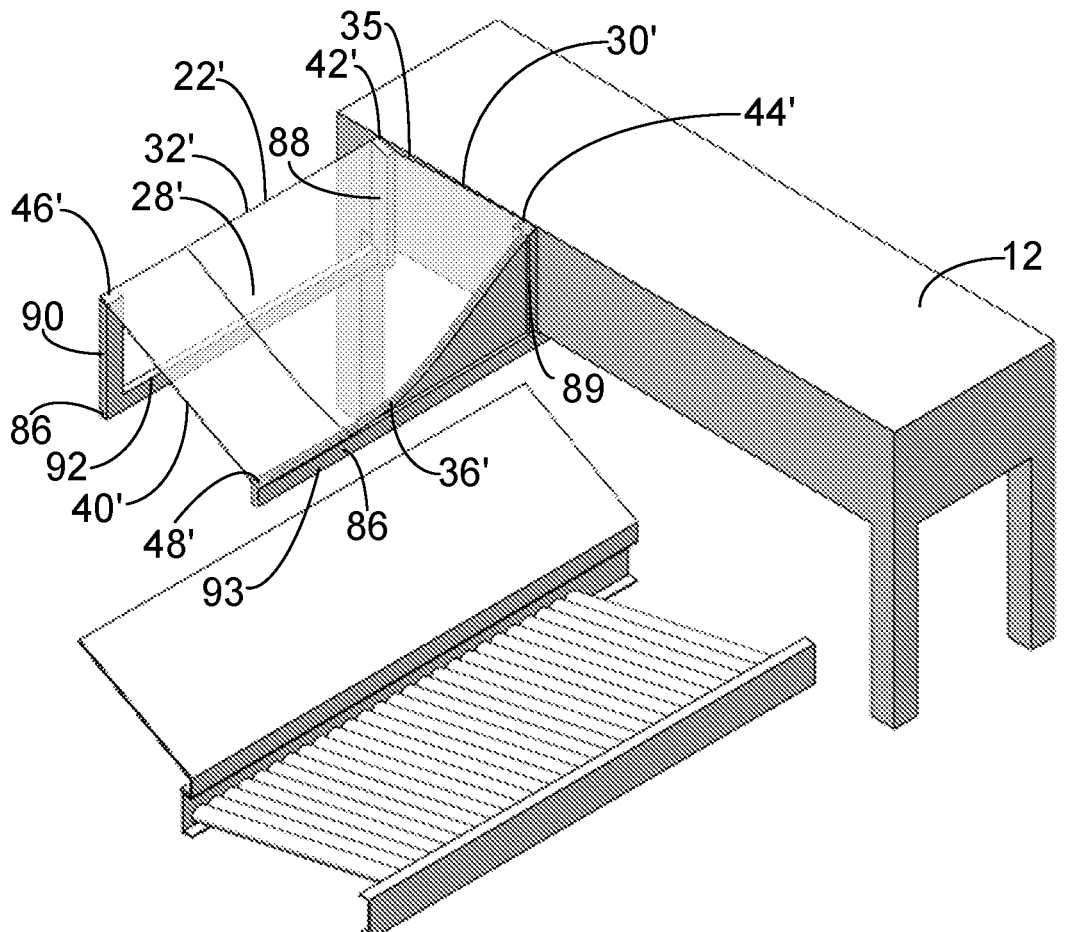
FIG. 7
FIG. 6

SORTING CONVEYOR SYSTEM

BACKGROUND

The invention relates generally to power-driven conveyors and in particular, to sorting conveyors sorting articles off onto chutes.

Sorting conveyors, or sorters, sort parcels to selected destinations. In many conveyor installations, the sorting conveyors sort the parcels off onto chutes down which the parcels slide to a discharge conveyor. In high-speed sorting, parcels sorted onto chutes can tip over, which can be a problem for parcels that have a preferred bottom side or that must be properly oriented for labeling or scanning. Furthermore, when discharge conveyors are far below the level of the sorter, long chutes are required to span the distance without being so steep as to cause damage to the parcels. But long chutes can be expensive and take up a lot of valuable floor space.

SUMMARY

One version of a conveyor system embodying features of the invention comprises a sorting conveyor that extends in length from a first end to a second end and in width between two sides. The sorting conveyor has sorting positions along at least one of the sides. Chutes extend outward of the sorting conveyor at each one of the sorting positions. Each of the chutes has a top surface bounded by: (1) a proximal edge along the side of the sorting conveyor at the sorting position; (2) an upper edge extending outward of the sorting conveyor to a distal end and forming a first corner of the top surface with the proximal edge; (3) a discharge edge extending outward of the sorting conveyor to a distal end and forming a second corner of the top surface with the proximal edge; and (4) a distal edge forming third and fourth corners of the top surface with the upper and discharge edges. The upper edge of the top surface of the chute is linear, and the discharge edge follows a curve whose slope decreases monotonically from the second corner of the top surface to the fourth corner.

Another version of a conveyor system comprises a sorting conveyor that extends in length from a first end to a second end and in width between two sides. The sorting conveyor is configured to advance articles in a downstream direction toward the second end and selectively divert articles off at least one side at sorting positions along the length of the sorting conveyor. Chutes extend outward of the sorting conveyor at each of the sorting positions. Each chute includes a top surface bounded by: (1) a proximal edge along the side of the sorting conveyor at the sorting position; (2) an upper edge extending outward of the sorting conveyor to a distal end and forming a first corner of the top surface with the proximal edge; (3) a discharge edge extending outward of the sorting conveyor upstream of the upper edge to a distal end and forming a second corner of the top surface with the proximal edge; and (4) a distal edge forming third and fourth corners of the top surface with the upper and discharge edges. The top surface includes: a first declining region extending downward and away from the second corner and bounded by portions of the proximal and discharge edges, a second declining region extending downward and away from the third corner and bounded by portions of the upper and distal edges; and a curved intermediate region extending from the first declining region to the second declining region and along which articles received from the sorting conveyor over the proximal edge are guided off the chute over the discharge edge.

BRIEF DESCRIPTION OF THE DRAWINGS

FIG. 5 is a top plan view of another version of a conveyor system as in FIG. 1, but with a discharge conveyor having oblique rollers.

FIG. 6 is an isometric view of another version of a conveyor system as in FIG. 5 with an upper chute having a different topography.

FIG. 7 is an end view of the upper chute of FIG. 6.

DETAILED DESCRIPTION

Figure 1:
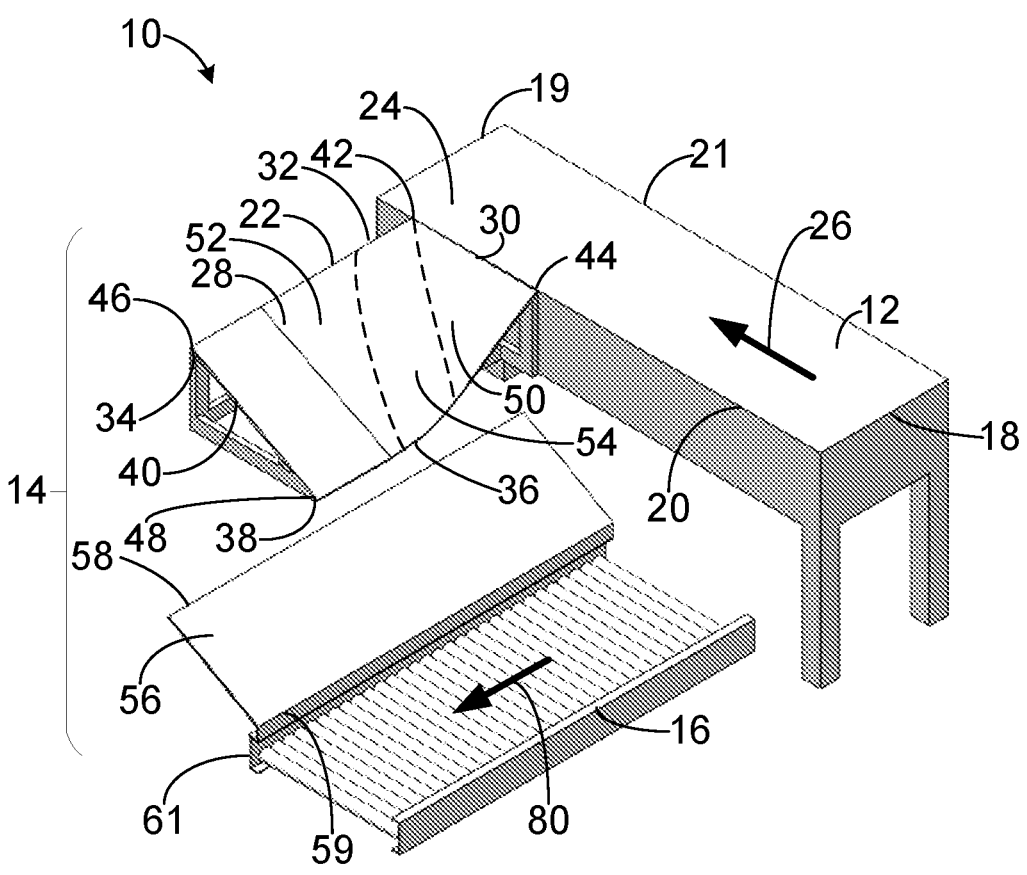
FIG. 1 is an isometric view of one version of a conveyor system embodying features of the invention.

One version of a conveyor system embodying features of the invention is shown in FIGS. 1-4. The conveyor system 10 comprises a sorting conveyor 12, a chute system 14, and a discharge conveyor 16. The sorting conveyor 12 extends in length from an upstream end 18 to a downstream end 19 and in width from a first side 20 to a second side 21. An upper chute 22 is shown attached to or proximate the first side 20 of the sorting conveyor 12 at a sorting position 24. For simplicity the sorting conveyor 12 is shown as a short conveyor with an upper chute 22 at only the first side 20. But typically the sorting conveyor would be much longer with multiple sorting positions along its length sorting articles, such as parcels, packages, envelopes, cartons, boxes, and bags, off one or both sides 20, 21 and onto the chute system 14.

The sorting conveyor 12 can be realized, for example, as a shoe sorter, as a roller conveyor with pushers, cross belts, or swivel sorters at each sorting position, or as a modular roller belt with roller-actuation units at each sorting position. One example of such an actuated roller belt is the Series 7000 ARB™ belt manufactured and sold by Intralox, L.L.C., of Harahan, Louisiana, U.S.A. However realized, the sorting conveyor 12 advances articles upstream to downstream in a main conveying direction 26. Articles are selectively diverted off the sorting conveyor 12 at the sorting positions 24 and onto the upper chutes 22. The pre-assigned destination of each article determines the specific chute 12 to which the sorting conveyor 12 sorts the article.

The upper chute 22 catches and guides articles along a top surface 28 that extends outward of the side 20 of the sorting conveyor 12. The top surface 28 can be the face of a thin sheet of stainless or carbon steel or of a low-friction synthetic material, such as TIVAR® DrySlide lubricant-filled UHMW-polyethylene material sold by Mitsubishi Chemical Advanced Materials, Inc. The top surface 28 is bounded by four edges: (1) a proximal edge 30 at the first side 20 of the sorting conveyor 12; (2) an upper edge 32 that extends laterally outward of the sorting conveyor 12 to a distal end 34; (3) a discharge edge 36 that extends outward of the sorting conveyor to a distal end 38; and (4) a distal edge 40 between the upper and discharge edges 32, 36 at their distal ends 34, 38. The proximal and upper edges 30, 32 of the chute's top surface 28 meet at a first corner 42; the proximal and discharge edges 30, 36 meet at a second corner 44 upstream of the first corner 42 along the sorting conveyor 12; the upper and distal edges 32, 40 meet at a third corner 46; and the discharge and distal edges 36, 40 meet at a fourth corner 48.

Figure 2:
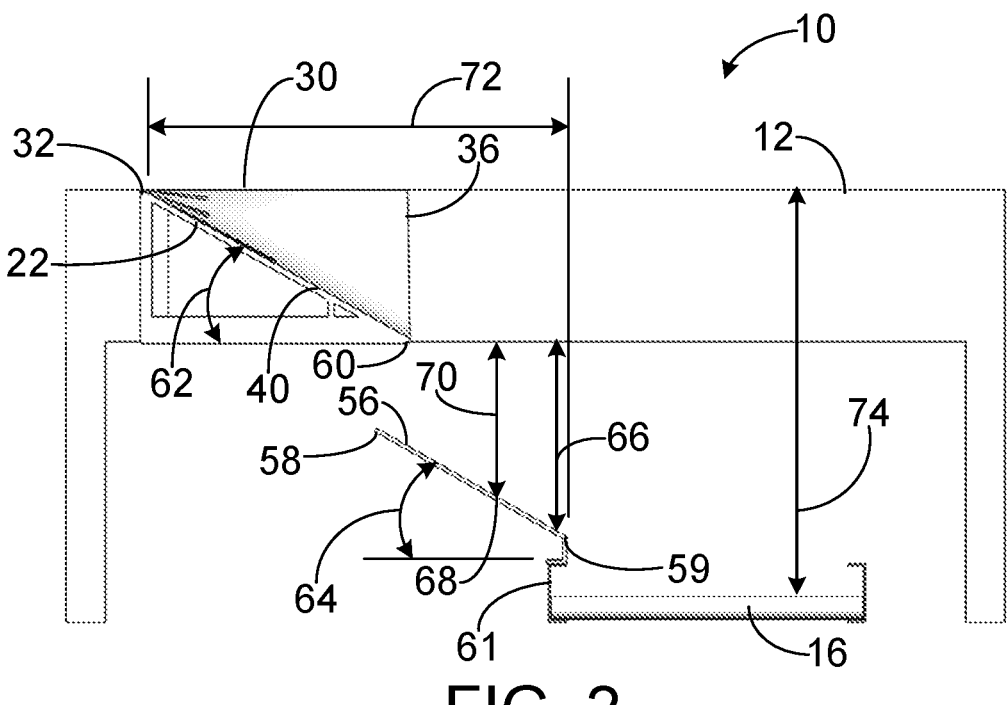
FIG. 2 is a side elevation view of the conveyor system of FIG. 1.
Figure 3:
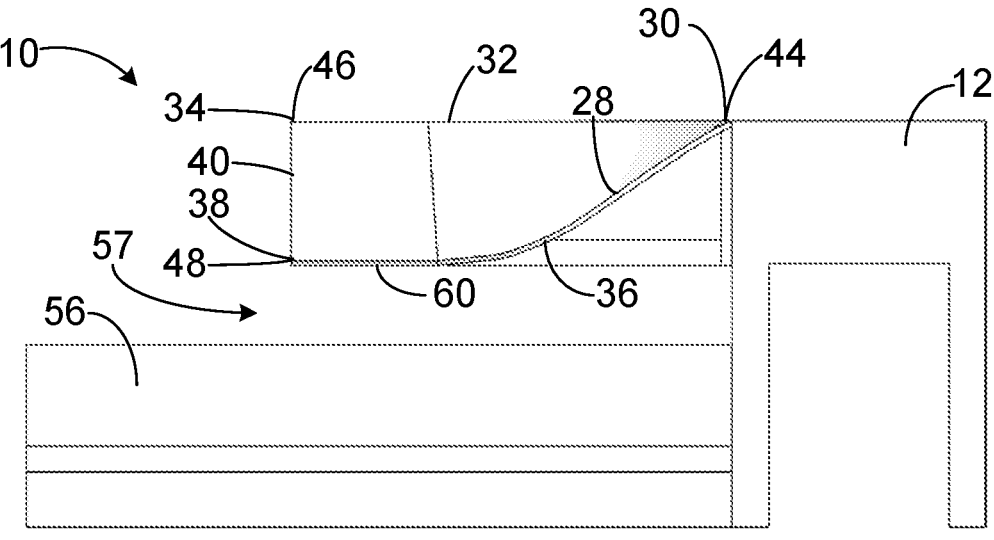
FIG. 3 is a front elevation view of the conveyor system of FIG. 1.
Figure 4:
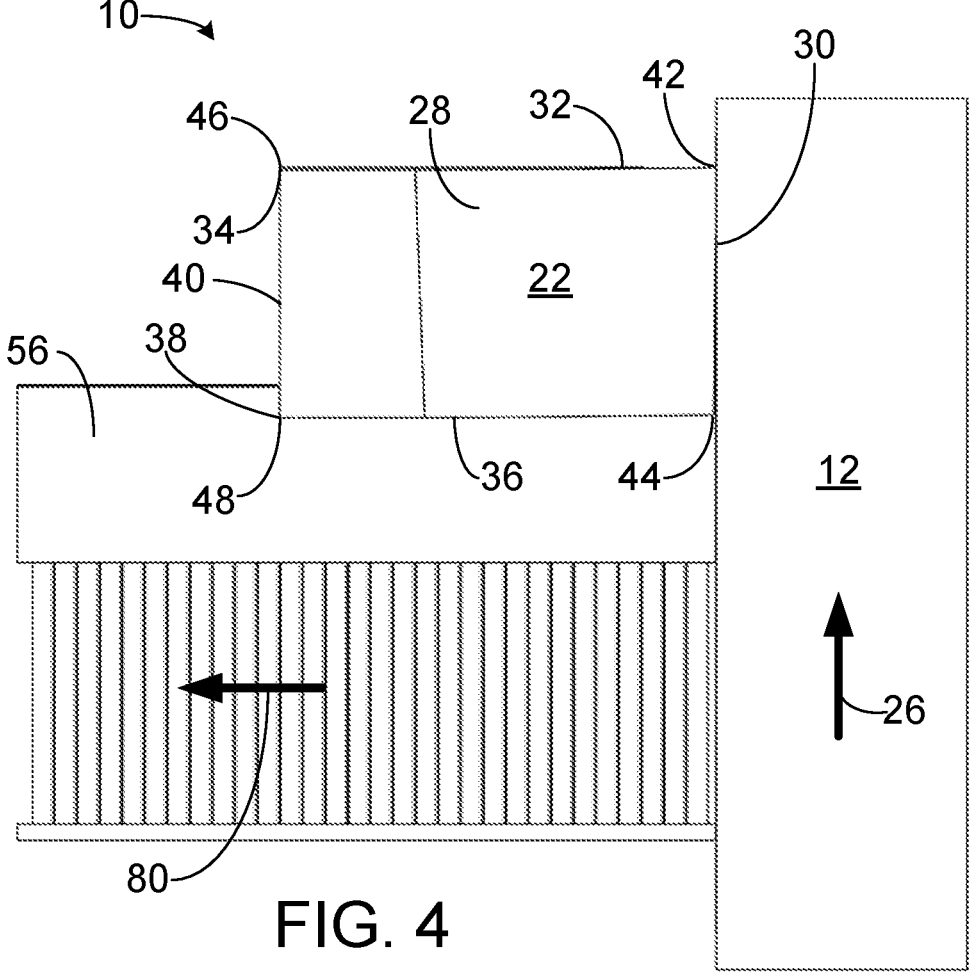
FIG. 4 is a top plan view of the conveyor system of FIG. 1.

The discharge edge 36 in the version shown in FIGS. 1-4 follows a curve whose slope decreases from the second corner 44 of the top surface 28 to the fourth corner 48. The decrease in slope is monotonic from a non-zero slope in an upper segment of the discharge edge 36 to a lesser or zero (i.e., horizontal) slope in a lower segment. FIG. 3 shows the discharge edge 36 with a constant non-zero slope in the upper linear segment, a zero slope in the lower linear segment, and a steadily decreasing slope in a curved intermediate segment of the discharge edge between the upper and lower segments.

Figure 11:
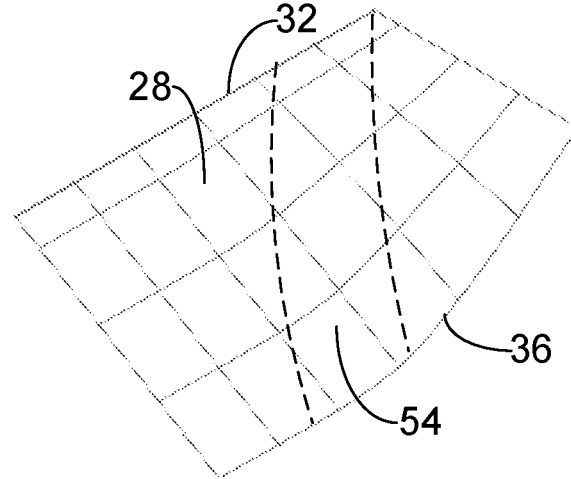
FIG. 11 is an isometric topographical map of the top surface of the top chute in the conveyor system of FIG. 1.

The relative shapes of the four edges 30, 32, 36, 40 of the top surface 28 of the upper chute 22 give the top surface a complex topography, as also shown in FIG. 11 with contour lines. The resulting top surface 28 has a first generally triangular declining region 50 that extends downward and away from the second corner 42, a second generally trapezoidal declining region 52 that extends downward and away from the third corner 46, and a curved intermediate region 54 that extends from the first declining region 50 to the second declining region 52. The first and second declining regions 50, 52 in this exemplary version are generally planar regions that are in skewed relationship to each other. But the regions 50, 52 do not have to be planar. The intermediate region 54 of the top surface 28 of the chute 22 forms a curved trough that extends from an elevated region of the top surface extending down from the first corner 42 and the upper edge, at which sorted packages are propelled from the sorting conveyor 12, to a lower discharge region at the discharge edge 36. The curved trough of the intermediate region 54 guides articles down the chute 22.

Articles drop off the upper chute 22 along a ballistic path and onto a lower chute, or slide 56, that forms the rest of the chute system 14. The slide 56 angles downward from an upper end 58 to a lower end 59. The slide 56 is shown mounted at its lower end 59 to a side rail 61 of the discharge conveyor 16. But the slide 56 could be supported in other ways that position its lower end 59 at the side of the discharge conveyor 16. The lower end 59 of the slide 56 is shown at a level above the level of the conveying surface of the discharge conveyor 16, but the lower end could be level with the discharge conveyor's conveying surface. And the slide 56 could be curved concavely from a steeper slope at its upper end 58 to a shallower slope at its lower end 59. The upper end 58 of the slide 56 is at a level below the lowest level 60 of the discharge edge 36 of the upper chute 22 across a gap 57. An elongated slide that extends under the sorting conveyor 12 can receive articles from upper chutes 22 on both sides of the sorting conveyor or from the upper chutes of parallel sorting conveyors.

Exemplary dimensional relationships of the version of the conveyor system of FIGS. 1-4 are shown in FIG. 2. But other conveyor-system configurations would have other dimensional relationships. The distal edge 40 of the top surface 28 of the upper chute 22 is angled off horizontal at an angle 62 of 28°, but angles of from about 27° to about 30° are helpful in reducing the number of overshoots of the slide 56 and the number of tipped articles. If the angle 62 is too shallow, fast-moving articles are more likely to overshoot the slide 56. If the angle 62 is too steep, the articles move too fast and are more likely to tip. The slide 56 is tilted off horizontal at an angle 64 of 30°. The lowest level 60 of the discharge edge 36 of the upper chute 22 is 63.5 cm above the lower end 59 of the slide 56, as indicated by two-headed arrow 66. The mean position 68 on the slide 56 at which the centers of articles land defines a mean drop distance 70 for the articles. The mean drop distance 70 for the arrangement of FIGS. 1-4 for a range of article sizes, shapes, and weights ranges from 38 cm to 56 cm. The horizontal distance 72 from the upper edge 32 of the top surface 28 of the upper chute 22 to the lower end 59 of the slide 56 is less than 1.6 m for this configuration, which results in a small footprint for a drop in package elevation 74 of 1.2 m from the sorting conveyor 12 to the discharge conveyor 16.

The exemplary version of the conveyor system shown in FIGS. 1-4 has other geometric relationships. As best shown in FIG. 3, the upper edge 32 of the top surface 28 of the upper chute 22 is linear and horizontal. But it could be angled downward. As best shown in FIG. 1, the proximal edge 30 is linear and horizontal.

Articles slide off the slide 56 and onto the discharge conveyor 16, which is shown in FIGS. 1-4 as a powered roller conveyor having rollers arranged to propel the articles in a discharge conveying direction 80. Each discharge conveyor 16 may receive articles from the slides 56 of chute systems 14 on both sides of the sorting conveyor 12 or from the chute systems of parallel sorting conveyors. In another version, shown in FIG. 5, a discharge conveyor 16' has rollers arranged to direct articles in an oblique direction 82 to align the articles against a far side rail 84 of the discharge conveyor as they are conveyed.

Another version of a conveyor system is shown in FIGS. 6 and 7, in which the upper chute 22' is shown as transparent to reveal the chute's support structure 86. The upper chute 22' differs from the upper chute 22 of FIGS. 1-4 in that the proximal edge 30' of the top surface 28' is not linear along its entire length and is not horizontal. Rather the proximal edge 30' declines gradually downstream from its second corner 44' until it rises sharply as it approaches its first corner 42'. The different arrangement of the proximal edge 30' changes the topography of the upper chute 22' from that of FIGS. 1-4. The sharp increase in the slope of the proximal edge 30' at the first corner 42' gives the chute a more vertical backstop near the sorting conveyor 12 to help prevent sorted-off articles from overrunning the chute 22'.

The chute 22' is attached to the support structure 86 at its four corners 42', 44', 46', 48' and is cantilevered from the side of the sorting conveyor 12. The support structure 86 includes two horizontal beams 92, 93 and three vertical posts 88, 89, 90. The horizontal beams 92, 93 extend from under the sorting conveyor 12 outward to distal ends below the distal edge 40' and form the base of the cantilevered connection of the upper chute 22' to the sorting conveyor 12. The vertical posts 88, 89, 90 extend upward from the horizontal beams 92, 93. Three of the corners 42', 44', 46' of the top surface 28' are attached to top faces of the vertical posts 88, 89, 90. The fourth corner 48' is attached to the top face of the horizontal beam 93 at its distal end. The top faces of the vertical posts 88, 89, 90 are shown slanted to fix the starting orientations of the various regions of the top surface 28' of the chute 22' that is responsible for forming the troughed intermediate region 54'. The top face of the second vertical post 89 slants downward away from the sorting conveyor 12 to angle the chute downward. The top face of the third vertical post 90 is slanted downward toward the discharge edge 36' of the chute 22'. And the top face of the first vertical post 88 is slanted downward toward the second vertical post 89 to produce the backstop at the entry onto the chute 22'. The proximal edge 30' curves gradually downward from the second corner 44' toward the first corner 42' and then curves more rapidly upward from a dip 35 in the edge to the first corner. The dip 35 is closer to the first corner 42' than to the second corner 44'. The upper face at the distal end of the horizontal beam 93 is slanted downward to the discharge edge 36'.

Figure 8:
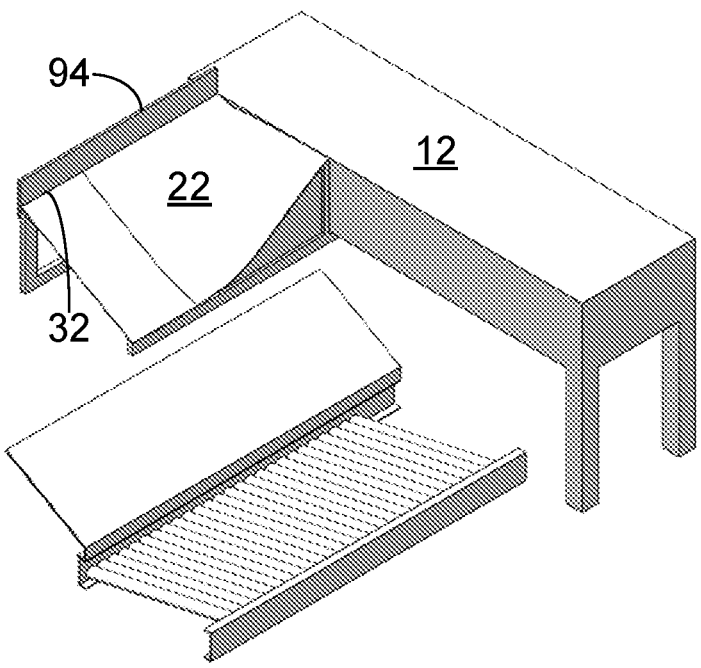
FIG. 8 is an isometric view of a conveyor system as in FIG. 6 with a vertical backstop.
Figure 9:
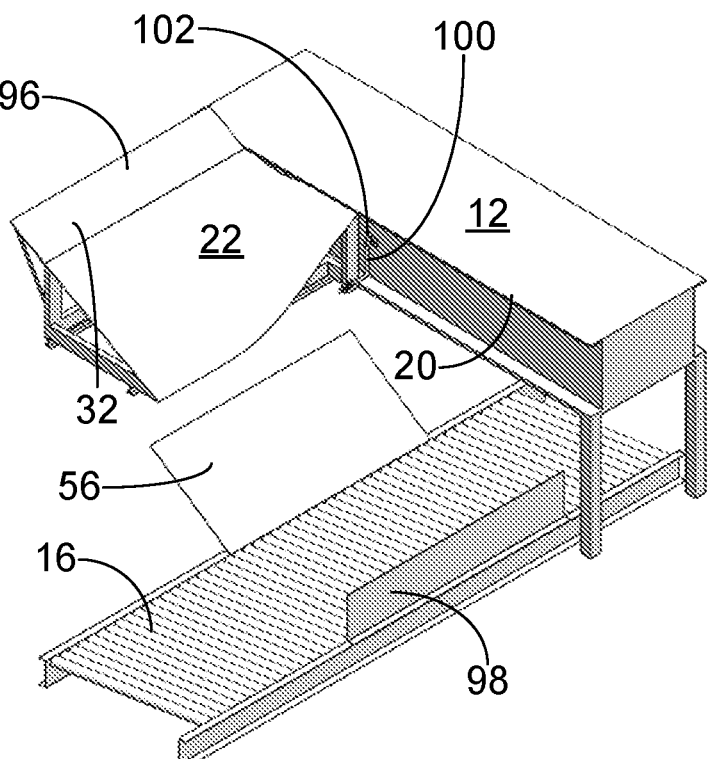
FIG. 9 is an isometric view of a conveyor system as in FIG. 6 with an upper chute extension, with a slide and a discharge conveyor barrier shown in up operational positions, and with a foldable upper chute shown in a down operational position.
Figure 10:
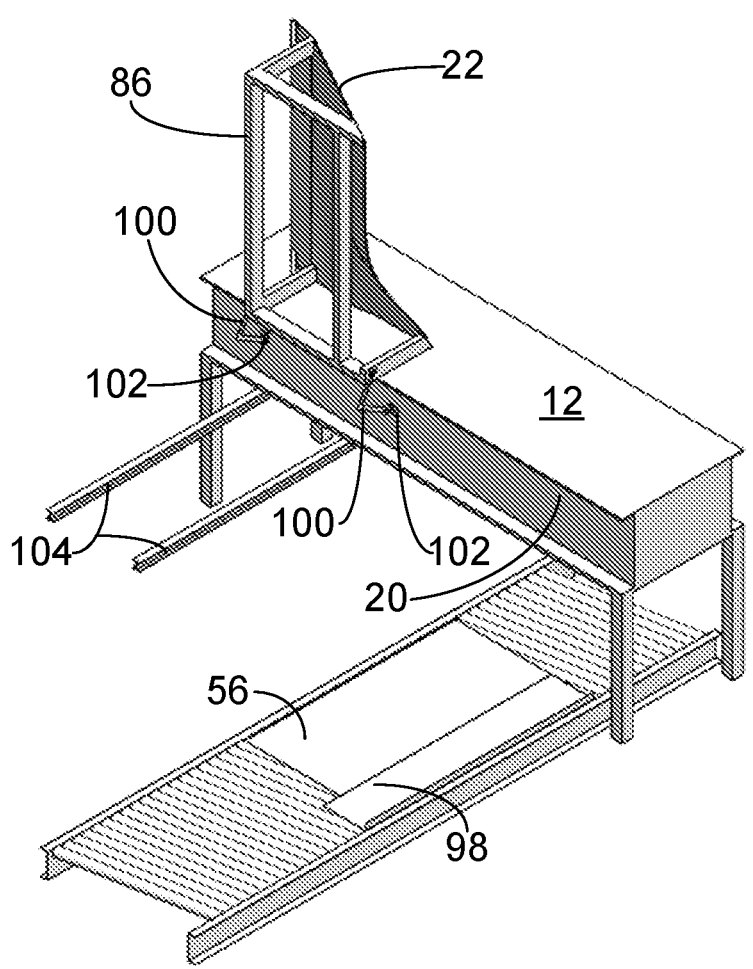
FIG. 10 is an isometric view of the conveyor system of FIG. 9 with the barrier and slide shown in down stowed positions and with the upper chute shown in an up stowed position.

FIG. 8 shows a vertical wall 94 that serves as a backstop to catch articles flung from the sorting conveyor 12 on a high trajectory. The wall 94 extends upward at the upper edge 32 of the upper chute 22. FIG. 9 shows an extension of the upper edge 32 of the upper chute 22. The extension is formed by an extension wall 96 that extends obliquely upward and outward of the upper chute 22 from its upper edge 32. The extension wall 96 catches articles flung from the sorting conveyor 12 past the chute 22. A barrier 98 at the side of the discharge conveyor 16 opposite the slide 56 blocks articles from overshooting the discharge conveyor. As shown in FIGS. 9 and 10, the upper chute 22 is attached to the first side 20 of the sorting conveyor 12 by a pair of L-shaped arms 100 at the lower corners of the upper chute's support structure 86. The arms 100 attach to the first side 20 of the sorting conveyor 12 at pivots 102, which allow the upper chute 22 to move from a down operational position as in FIG. 9 to an up stowed position as in FIG. 10. Like the upper chute 22, the slide 56 and the discharge-conveyor barrier 98 are pivotally attached to the sides of the discharge conveyor 16 and can be folded down from their up operational positions into down stowed, or maintenance, positions. In the stowed position the slide 56 and the barrier 98 abut to form a walkway over the discharge conveyor 16. Support beams 104 supporting the upper chute 22 in the down position are shown in FIG. 10 extending laterally outward of the underside of the sorting conveyor 12.

Although the invention has been described with respect to a few versions, other versions are possible. For example, the discharge conveyor can instead be realized as a belt conveyor or can be replaced by a bin, a tote, or other receptacle. As another example, the upper chute does not have to be cantilevered; it can be supported by separate, free-standing structure.

What is claimed is:

1. A conveyor system comprising:
    a sorting conveyor extending in length from a first end to a second end and in width between two sides and having sorting positions along at least one of the sides;
    a plurality of chutes, each extending outward of the sorting conveyor at one of the sorting positions and having a top surface bounded by:
        a proximal edge along the side of the sorting conveyor at the sorting position;
        an upper edge extending outward of the sorting conveyor to a distal end and forming a first corner of the top surface with the proximal edge;

a discharge edge extending outward of the sorting conveyor to a distal end and forming a second corner of the top surface with the proximal edge; and
        a distal edge angled off horizontal and forming third and fourth corners of the top surface with the upper and discharge edges;
    wherein the upper edge of the top surface of the chute is linear and the discharge edge follows a curve whose slope decreases monotonically from the second corner of the top surface to the fourth corner.

2. The conveyor system as claimed in claim 1 wherein the discharge edge follows a curve whose slope decreases from a first non-zero slope at the second corner of the top surface to a zero slope at the fourth corner.

3. The conveyor system as claimed in claim 1 wherein the discharge edge follows a curve having a linear segment that extends from the second corner of the top surface part of the way toward the fourth corner.

4. The conveyor system as claimed in claim 1 wherein the upper edge is horizontal.

5. The conveyor system as claimed in claim 1 wherein the proximal edge is linear.

6. The conveyor system as claimed in claim 1 wherein the proximal edge declines gradually from the second corner toward the first corner along a major portion of its length and then inclines sharply along a minor portion of its length to the first corner to form a backstop in the top surface of the chutes.

7. The conveyor system as claimed in claim 1 wherein the distal edge is linear.

8. The conveyor system as claimed in claim 1 wherein the top surface includes:
    a first planar region extending away from the second corner;
    a second planar region extending away from the third corner in skewed relationship to the first planar region; and
    a curved intermediate region extending from the first planar region to the second planar region.

9. The conveyor system as claimed in claim 8 wherein the first planar region extends from the upper edge to a lower segment of the discharge edge of the top surface and wherein the second planar surface extends from the proximal edge to an upper segment of the discharge edge.

10. The conveyor system as claimed in claim 1 wherein the top surface includes:
    a triangular first region extending away from the second corner;
    a second region extending away from the third corner in skewed relationship to the triangular first region; and
    a curved intermediate region extending from the triangular first region to the second region.

11. The conveyor system as claimed in claim 1 comprising a plurality of slides, each angled downward to a lower end from an upper end disposed at a level below the lowest level of the discharge edge of the top surface of each of the chutes.

12. The conveyor system as claimed in claim 11 comprising:
    a plurality of discharge conveyors, each having first and second sides and attached to the lower end of each of the slides at the first side; and
    a plurality of barriers standing up from the second sides opposite the slides.

13. The conveyor system as claimed in claim 1 comprising vertical walls extending upward from the chutes at the upper edges.

14. The conveyor system as claimed in claim 1 comprising extension walls extending obliquely upward and outward of the chutes at the upper edges.

15. The conveyor system as claimed in claim 1 wherein the chutes are pivotally attached to the sides of the sorting conveyor so as to be movable from a down operational position to an up stowed position.

16. A conveyor system comprising:

a sorting conveyor extending in length from a first end to a second end and in width between two sides, wherein the sorting conveyor is configured to advance articles in a downstream direction toward the second end and selectively divert articles off at least one side at sorting positions along the length of the sorting conveyor;

a plurality of chutes, each extending outward of the sorting conveyor at one of the sorting positions and including a top surface bounded by:

a proximal edge along the side of the sorting conveyor at the sorting position;

an upper edge extending outward of the sorting conveyor to a distal end and forming a first corner of the top surface with the proximal edge;

a discharge edge extending outward of the sorting conveyor upstream of the upper edge to a distal end and forming a second corner of the top surface with the proximal edge; and a distal edge forming third and fourth corners of the top surface with the upper and discharge edges;

wherein the top surface includes:

a first declining region extending downward and away from the second corner and bounded by portions of the proximal and discharge edges;

a second declining region extending downward and away from the third corner and bounded by portions of the upper and distal edges; and a curved intermediate region extending from the first declining region to the second declining region and along which articles received from the sorting conveyor over the proximal edge are guided off the chute over the discharge edge.

17. The conveyor system as claimed in claim 16 wherein the first and second declining regions are planar.

18. The conveyor system as claimed in claim 16 wherein the distal edge is linear and is angled off horizontal.

19. The conveyor system as claimed in claim 16 comprising a plurality of slides, each associated with one or more of the chutes and angled downward to a lower end from an upper end disposed at a level below the lowest level of the discharge edge of the top surface of the associated chute.

20. The conveyor system as claimed in claim 19 comprising a plurality of discharge conveyors, each associated with one or more of the slides and positioned to receive articles sliding down the slide and over the slide's lower end and convey the articles in a conveying direction, wherein the discharge conveyor includes rollers that rotate oblique to the conveying direction to align the articles along a side of the discharge conveyor.

21. The conveyor system as claimed in claim 20 comprising:

a plurality of discharge conveyors having first and second sides and attached to the lower ends of the slides at the first sides; and a plurality of barriers standing up from the second sides of the discharge conveyors opposite the slides to block articles from overshooting the discharge conveyor.

22. The conveyor system as claimed in claim 21 wherein the slides and the barriers are pivotally attached to the first and second sides of the discharge conveyors so as to be movable from an up operational position to a down stowed position in which the slides and the barriers are usable as walkways across the discharge conveyors.

23. The conveyor system as claimed in claim 16 comprising vertical walls extending upward from the chutes at the upper edges.

24. The conveyor system as claimed in claim 16 comprising extension walls extending obliquely upward and outward of the chutes at the upper edges.

25. The conveyor system as claimed in claim 16 wherein the proximal edge declines gradually from the second corner toward the first corner along a major portion of its length and then inclines sharply along a minor portion of its length to the first corner to form a backstop in the top surface of the chute.

26. The conveyor system as claimed in claim 16 wherein the chutes are pivotally attached to the sides of the sorting conveyor so as to be movable from a down operational position to an up stowed position.

* * * * *